(No Model.) 2 Sheets—Sheet 1.

W. LEAVEGOOD.
WAGON JACK.

No. 463,355. Patented Nov. 17, 1891.

Witnesses,
G. B. Towse
H. F. Ascheck

Inventor,
William Leavegood
By Dewey & Co.
Attys

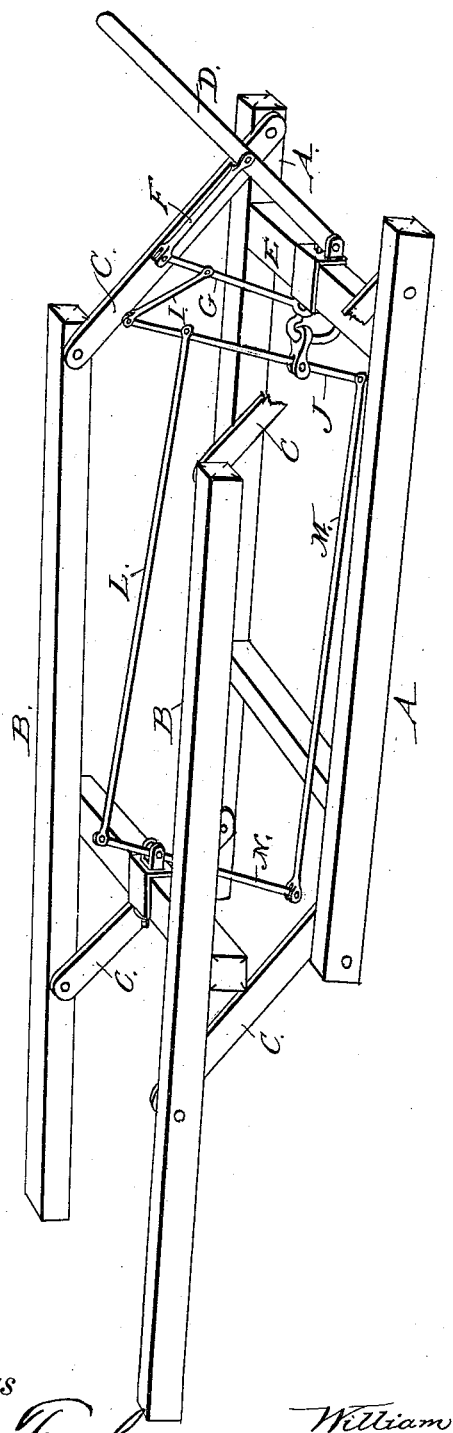

UNITED STATES PATENT OFFICE.

WILLIAM LEAVEGOOD, OF SACRAMENTO, CALIFORNIA.

WAGON-JACK.

SPECIFICATION forming part of Letters Patent No. 463,355, dated November 17, 1891.

Application filed July 1, 1891. Serial No. 398,166. (No model.)

*To all whom it may concern:*

Be it known that I, WILLIAM LEAVEGOOD, a citizen of the United States, residing at Sacramento, Sacramento county, State of California, have invented an Improvement in Wagon-Jacks; and I hereby declare the following to be a full, clear, and exact description of the same.

My invention relates to a device which I call a "wagon-jack." Its object is to raise the whole vehicle from the ground, and it is especially useful in livery-stables and blacksmith or paint shops where work is to be done upon the vehicle and it is desirable to elevate it entirely from the ground.

It consists of a base with a parallel frame and connecting bars or links, and a peculiarly-constructed lever mechanism, whereby the upper movable part of the frame, when placed beneath the vehicle-axles, may be moved about its supporting bars or links so as to raise it and the vehicle.

Figure 1:
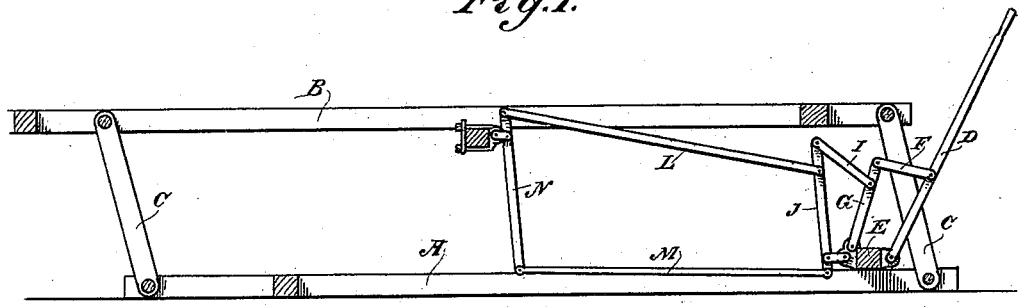
Figure 2:
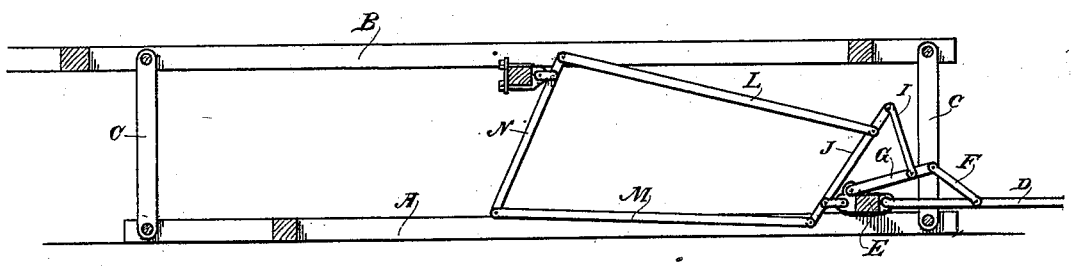

Referring to the accompanying drawings for a more complete explanation of my invention, Figure 1 is a vertical longitudinal section of my device, showing the frame in position to receive the load. Fig. 2 shows the same in its elevated position. Fig. 3 is an enlarged perspective view, partially broken away.

A is a base which consists of a frame-work of timbers stoutly joined together.

B B are the lifting-bars of the frame, which are of sufficient length to extend beneath the two axles of any vehicle, the width of the apparatus being such that it may be introduced between the wheels of the same. The bars B are connected with the frame-work A by stout links C, which are pivoted to both the frames A and B, so that the frame B may move about the pivot-pins and be raised or depressed in the manner of the sides of a parallel ruler.

In order to operate this device with sufficient power, I have shown a hand-lever D, which is fulcrumed to the cross-bar E of the lower frame. This lever is connected by a link F with the upper end of a lever G. The lower end of this lever G is fulcrumed at a point upon the cross-bar E of the lower frame, and a link I connects with a point on this lever intermediate between the upper and lower end. This link I extends to a second supplemental lever J, connecting with its upper end. This second supplemental lever is fulcrumed to the cross-bar E on the lower frame, and its lower end extends a short distance below the fulcrum-point. By means of two links L and M, one connected with the lever above and the other below the fulcrum, the lever J is united with a lever N, which has its fulcrum-point upon the upper movable frame B.

The fulcrum-point is intermediate the upper and lower ends of the lever, and the operation will then be as follows: The hand-lever being in the position which depresses the upper parallel bars B to a point which will allow the machine to be introduced beneath the axles of the vehicle, the lever is then drawn backward in an arc of a circle until it is brought into an approximately horizontal position. The position of the various levers before this movement takes place is shown in Fig. 1, and the position after the movement is completed is shown in Fig. 2. By this combination I am enabled so to multiply the power that by the single hand-lever the heaviest loaded vehicle may be elevated by this apparatus, so that the wheels are clear of the ground. This enables the workman to make any repairs which are necessary upon the wheels or running-gear without unloading the vehicle, the whole being supported temporarily upon this frame or jack.

It will be manifest that various other well-known arrangements of levers may be employed to produce the same result without essentially altering the character and operation of the mechanism.

Having thus described my invention, what I claim as new, and desire to secure by Letters Patent, is—

A wagon or lifting jack consisting of a main stationary frame and the parallel bars connected therewith by links about which said bars may be moved so as to raise or lower them, the hand-lever connected centrally with the cross-bar upon the main frame, the supplementary levers G and J, fulcrumed to the main frame, the connecting-links F and I, and the lever N, fulcrumed upon the movable frame and connected with the lever J, substantially as described.

In witness whereof I have hereunto set my hand.

WILLIAM LEAVEGOOD.

Witnesses:
J. T. COENTS,
RICHMOND DAVIS.